March 1, 1955  L. PETERS  2,703,287
SOFT PLASTIC FOOD PACKAGE
Filed June 10, 1950  2 Sheets-Sheet 1
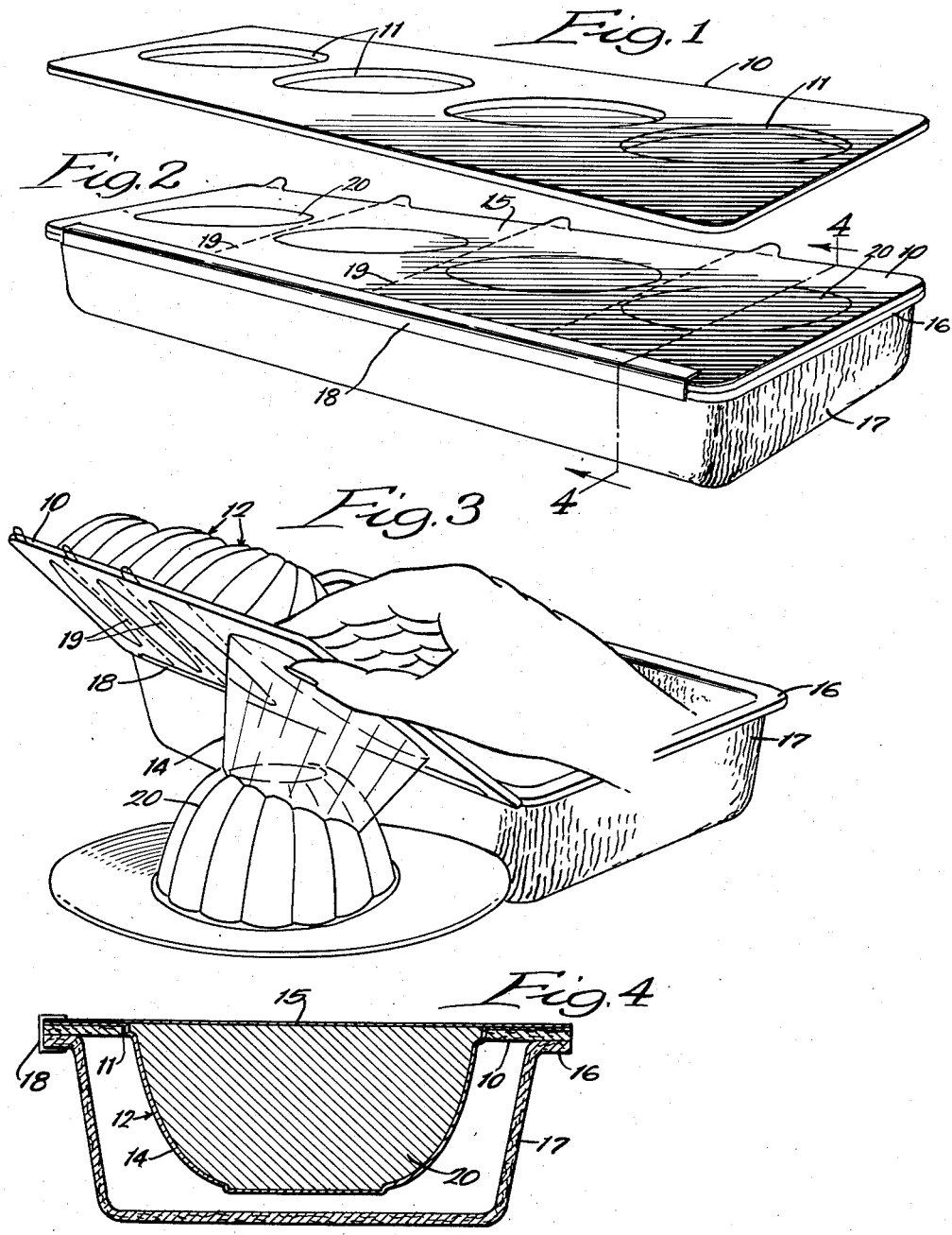
INVENTOR:
Leo Peters,
BY Dawson, Ooms, Brothers Spangenberg,
ATTORNEYS.

March 1, 1955  L. PETERS  2,703,287
SOFT PLASTIC FOOD PACKAGE
Filed June 10, 1950  2 Sheets-Sheet 2
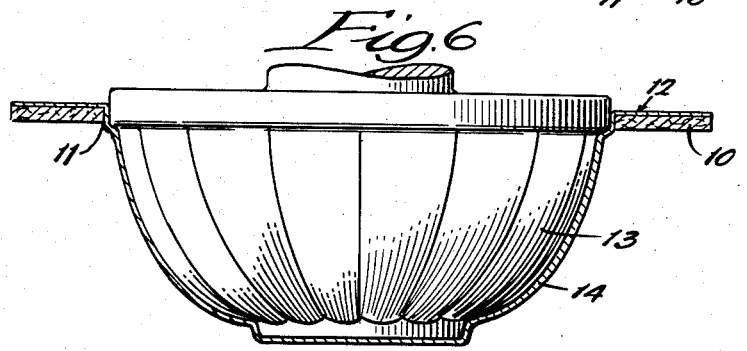
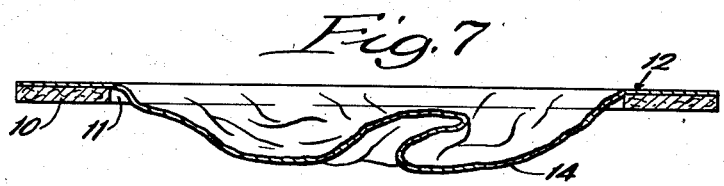
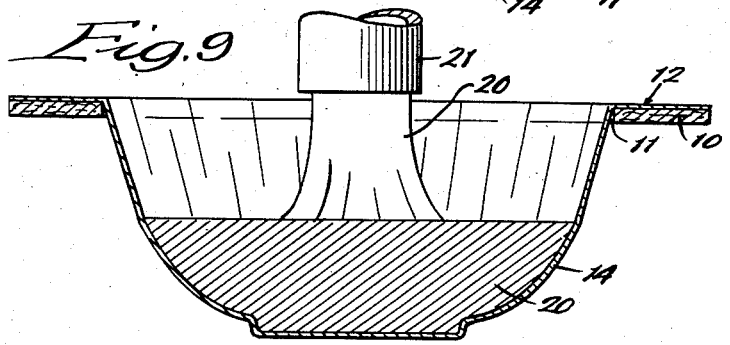
INVENTOR:
Leo Peters,
BY Dawson, Ooms, Booth and Spangenberg,
ATTORNEYS.

United States Patent Office 2,703,287
Patented Mar. 1, 1955

2,703,287

SOFT PLASTIC FOOD PACKAGE

Leo Peters, Evanston, Ill.

Application June 10, 1950, Serial No. 167,277

2 Claims. (Cl. 99—171)

This invention relates to a suspension pack for soft plastic foods. The invention is particularly useful in connection with a retail-size package in which soft plastic foods are suspended within individual compartments. The package is particularly adapted for the molding and supporting of foods such as butter, margarine, cheese, ice cream, gelatin, and the like.

An object of the invention is to provide a package of extremely simple and inexpensive structure, which may be handled from the place of fabrication to the place where the filling is to be made, so as to occupy a minimum of space while at the same time being immediately ready for filling and for molding the plastic food contents. A further object is to provide a package in which a flexible film is supported by a plate or member extending in a single plane, the film being collapsible into the same plane when in unfilled condition.

Yet another object is to provide a package highly effective for the sealing and supporting of soft plastic foods and consisting of a single apertured plate member provided with a film suspended therein to form a good pocket, the top of the pocket being sealed by a similar film.

A still further object is to provide in such a structure a film which may be stretched at predetermined points into tensilized elongations, from which there is no recovery, in order to form a desired shape to serve as a mold, the walls of the film, however, being collapsible when empty and, when filled, retaining their mold lines and shapes. The package is singularly adapted for the molding of plastic foods into shapes of non-straight edges and non-flat sides.

Yet another object is to provide a package in which a rigid wall is provided with apertures through which are suspended portions of a thin, flexible, collapsible film of sufficient strength to carry plastic foods; and also sealing means for the pockets to provide a complete closure.

A further object of the invention is to provide compartment walls that are suspended freely from the plate, with the walls of the cup suspended around the entire periphery of the cup, the weight of the contents being supported only from the plate so that bumps or jars to which the package is subjected will be absorbed by the plate structure, the flexible walls of the cup being yieldable so that the food, when chilled or warmed, can either contract or expand with no hindrance.

A further object is to provide a method of packaging soft plastic foods in which the foods are suspended in a film pocket and sealed in such suspended relation.

Other specific objects and advantages will appear as the specification proceeds.

The invention is shown in an illustrative embodiment by the accompanying drawings, in which—

Figure 1 is a perspective view of a plate having apertures therein for use in my invention; Fig. 2, a perspective view of a package embodying my invention; Fig. 3, a perspective view of the plate removed from the container and showing the removal of the contents of one portion of the package; Fig. 4, a transverse sectional view, the section being taken as indicated at line 4—4 of Fig. 2; Fig. 5, a transverse sectional view of the plate support provided with a stretchable film secured to the plate; Fig. 6, a view similar to Fig. 5 but showing the film in contact with a die being stretched and tensilized to form a permanently shaped mold; Fig. 7, a view similar to Fig. 6 but showing the film in collapsed and folded condition after the stretching and tensilizing operation but still retaining fully the mold marks therein; Fig. 8, a view similar to Fig. 7 but showing a plurality of plates in stacked relation for storing or shipping; and Fig. 9, a view of the plate and the suspended film pocket, the pocket being partially filled with a flowing food material.

In the illustration given, 10 designates a plate which may be formed in any shape and of any suitable material. The plate may be formed of cardboard, molded paper pulp, metal, plastic, or any other suitable material, and may be of a continuous sheet, woven, or latticed construction. I prefer to employ a relatively light-weight board of suitable rigidity which will serve as a support for film applied thereto as hereinafter described.

The plate or board 10 may be provided with one or more apertures 11 and the aperture or apertures may be of any desired shape and in any alignment.

To the board 10, I prefer to secure a film material 12 adapted to form a support for the plastic food. In the specific illustration given in Fig. 5, I provide a film material which is stretchable under the influence of a die 13, and I prefer to employ a film which, after being stretched to the desired extent, remains in its extended or tensilized position and does not tend to return to its original shape. For example, chlorinated rubber (Pliofilm), polyethylene and similar materials may be used. In some instances, it may be desirable to employ a material which does not normally stretch in contact with a cold die, but which is thermoplastic and flows under the influence of a heated die to a desired extended position. Such products include vinyl chloride, acetate co-polymers, rubber hydrochloride, vinylidene chloride, polyethylene, polyamides, and various modifications of such resins as are well known in the art.

The film 12 may be attached to the plate 10 along the top surface thereof by suitable adhesives and then the suspended plastic film cup 14 may be formed into any shape desired under the influence of the heated or cold die, depending upon the character of the film. In some instances, it may be desirable to pretreat the film before it is attached to the plate 10 to form the cups 14 therein. For some uses, vegetable parchments, metal foils, such as, for example, tin and aluminum foils, and a variety of other flexible films or sheets with or without the coatings or impregnations commonly employed thereon, may be used.

After the package has been formed by the union of the film sheet to the plate 10 and the molded cup provided through the aperture 11 of the plate 10, the cup may be filled with a soft plastic food and a film 15 secured over the film 12 by means of adhesive, heat sealing, or other means. Thus, a complete package is formed through the use only of the plate 10, the film 12, and the cover film 15. The plate 10 provides the rigidity needed and the two films 12 and 15 provide the enclosure for the soft plastic foods. No other members are needed for the forming of the package. The package thus formed may be suspended in an ordinary carton or other support, or the board 10 may be provided with depending collapsible members providing a support for the board. In the illustration given, I merely suspend the plate 10 upon the ledges 16 of the open-topped carton 17, as shown more clearly in Figs. 2 and 4. The edges of the plate 10 and the carton ledge 16 may be secured together by tape 18 or other means to form a shipping container. When the structure reaches the housewife, however, the carton 17 may be discarded, and if desired, the plate 10 may be thus placed within the refrigerator so as to occupy a minimum of space. Further economy in space is accomplished by folding the plate 10 over upon itself along a median transverse line.

If desired, the plate 10 may be provided with weakened transverse lines 19 formed by slitting the board at spaced points or by scoring the board, etc., so that, after one of the package portions has been emptied, that portion of the package may be torn away and removed.

In plant operations, it is a more desirable practice, after the plate 10 has been formed and the plastic 12 has been modified to form the mold cup 14 therein, to collapse the cup 14 and to store and ship the plates 10 in stacked relation, as illustrated in Fig. 8. It will be noted that the collapsed cup portions 14 lie compactly within the central space provided by the aligned apertures of the superposed plates so that each package occupies no more space than that required simply by the plate itself.

The film material, in the preferred operation, is caused to assume mold lines as illustrated in Fig. 6 and is also illustrated with respect to the effect of the molded lines upon the finished product, in Fig. 3. It is noteworthy that the resin film after being stretched and tensilized by the action of the heated or cold die, depending upon the character of the film, retains its mold lines in spite of the collapsing of the film to the extent indicated in Figs. 7 and 8 so that later at the filling plant when the plate 10 is suspended upon a support in the filling operation, the cup 14 readily re-assumes the shape in which it was molded. The folding and collapsing necessary to bring the cup into the condition illustrated in Figs. 7 and 8 and in which it lies in the same plane with the plate, does not cause the film to lose the molded shape initially imparted to it; such a molded shape being necessary in the molding of the plastic food in the later filling operation. In Fig. 9, the food material is indicated by the numeral 20 flowing from a filling nozzle 21 and being molded into the shape of cup 14.

Operation

In the operation of the method and structure shown, the plate 10 is provided with a film 12 which may be pre-treated to form the cup 14, or which may be treated in situ, as illustrated in Fig. 6, to form the cup 14. The package thus formed may be shipped in collapsed condition, as illustrated in Figs. 7 and 8, to the plant where the package is to be filled; or if the package is formed at the filling plant, it may be stored and handled in said collapsed condition. In the filling factory, the cups 14 of a plate 10 may be filled (preferably simultaneously) by the use of nozzles aligned with the cups and thereafter the cover film 15 may be sealed against film 12 by heat sealing, adhesive, or other means to form the finished package. The finished package may be shipped as is, or it may be placed within a carton 17, as illustrated in Figs. 2 and 3.

When the housewife desires to remove the butter, oleomargarine, ice cream, or other commodity from the cup, she removes the portion of the cover 15 which is directly above one of the cups and then inverts the entire plate 10, as illustrated in Fig. 3. This causes the cup casing 14 to fall outwardly and allows the film to peel freely and evenly from the molded food product, as illustrated in Fig. 3. If the product peels slowly from the film, the housewife may press against the inner surface of the film to effect the release of it from the food and without coming in contact with the portion of the film lying in contact with the food. That portion of the plate or board 10 may then be torn away along the line 19 and the remainder of the package may be placed back in the refrigerator.

While I have provided a box 17 for supporting the package, it will be understood that any desired type of wrapper or carton may be employed and, in fact, the package shown may be used without any wrapper or carton.

With the structure shown, it will be noted that the entire package including the film, the plate, and the cover lies within a single very narrow and flat plane and in a plane barely thicker than the plate 10 itself. As a result, shipping and storing before filling, may be made with the entire package occupying an extremely narrow space. While I have illustrated the package as provided with a cup 14 which later is collapsed, it will be understood that the package may be shipped in the form illustrated in Fig. 5 to the filling plant and the formation of the cup 14 may be accomplished in the filling line just prior to the pouring of the food material into the cup. Other variations from the detailed procedure set out may obviously be made.

The new package is extremely attractive in that the food material is visible through the transparent plastic film. Further, when the plate 10 is folded upon itself along a median line, the food material on either side is exposed and the compact package thus produced may be wrapped or sold in folded condition without further wrapping. By providing a film cover, the film over a selected cup may be removed to permit the removal of the food contents of the cup and during this operation the remaining portion of the cover serves to prevent the dropping out of the food material in the other cups. Likewise, such remaining covered portions provide an unbroken seal about the remaining food content, which is returned to the refrigerator.

While in the foregoing specification, I have set forth a specific structure in considerable detail for the purpose of illustrating an embodiment of the invention, it will be understood that such details of structure and method may be varied widely by those skilled in the art without departing from the spirit of my invention.

I claim:

1. A soft plastic food package, comprising a hollow open-topped housing providing a compartment therein, a thin, flat plate supported by said housing and covering the open top thereof, said plate having a plurality of spaced openings therethrough communicating with said housing compartment, each of said openings having a reversible pocket formed of thin, flexible film suspended therethrough and hanging downwardly within said compartment, the walls of said pockets being spaced from the walls of said housing and from the walls of the adjacent pocket, a soft plastic food body within each of said pockets conforming to the shape thereof, and a cover secured over the tops of said pockets.

2. The soft plastic food package of claim 1 which is characterized by the further fact that each of said pockets has an indented design impressed on the walls thereof and said designs being correspondingly impressed on the adjacent surfaces of said soft plastic food bodies.

References Cited in the file of this patent

UNITED STATES PATENTS

| Number | Name | Date |
|---|---|---|
| 1,114,825 | Van Auken | Oct. 27, 1914 |
| 1,945,397 | Gray | Jan. 30, 1934 |
| 1,955,745 | Hurley | Apr. 24, 1934 |
| 1,990,145 | Swift | Feb. 5, 1935 |
| 2,024,033 | Epstein | Dec. 10, 1935 |
| 2,086,887 | Wilcox | July 13, 1937 |
| 2,134,908 | Copeman | Nov. 1, 1938 |
| 2,235,964 | Meyer et al. | Mar. 25, 1941 |
| 2,352,503 | Walton | June 27, 1944 |
| 2,438,089 | Carson | Mar. 16, 1948 |
| 2,491,423 | Snyder | Dec. 13, 1949 |
| 2,501,570 | Larsen | Mar. 21, 1950 |
| 2,517,492 | Johnston | Aug. 1, 1950 |
| 2,530,127 | Kubik | Nov. 14, 1950 |
| 2,532,871 | Wagner | Dec. 5, 1950 |